United States Patent [19]

Steed

[11] 4,094,041
[45] June 13, 1978

[54] DRESSING HOLDER FOR SMALL GAME

[76] Inventor: Earl B. Steed, P.O. Box 742, Jacksonville, Ark. 72076

[21] Appl. No.: 788,181

[22] Filed: Apr. 18, 1977

[51] Int. Cl.² ............................................. A22B 1/00
[52] U.S. Cl. .................................... 17/44.2; 17/44.1
[58] Field of Search ............... 17/44, 44.1, 44.2, 44.3, 17/44.4, 11

[56] References Cited

U.S. PATENT DOCUMENTS

| | | | |
|---|---|---|---|
| 62,158 | 2/1867 | Savage | 17/44 |
| 1,117,436 | 11/1914 | Person | 17/44 |
| 2,405,638 | 8/1946 | Bilek | 17/44.1 |
| 2,613,390 | 10/1952 | Wayne | 17/44.1 |
| 2,731,665 | 1/1956 | Zebarth | 17/44.1 |
| 2,981,972 | 5/1961 | Zebarth | 17/44.1 |
| 3,137,030 | 6/1964 | Varner | 17/44.2 |
| 3,216,057 | 11/1965 | Strandine | 17/44.1 |
| 3,570,049 | 3/1971 | Muckelrath | 17/44.2 |
| 3,895,415 | 7/1975 | Volk | 17/44.1 |
| 3,945,088 | 3/1976 | Heightshoe | 17/44.2 |

FOREIGN PATENT DOCUMENTS 588,999  11/1933  Germany .............................. 17/44

Primary Examiner—Louis G. Mancene
Assistant Examiner—Paul J. Hirsch
Attorney, Agent, or Firm—Ralph R. Pittman

[57] ABSTRACT

A holder from which the carcass of a small animal, such as a squirrel, may be suspended in a head-down position for partial skinning and a head-up position for completing the dressing out of the carcass, has a diamond-shaped frame adapted to be hung from the upper acute angle portion of the frame. A pair of pointed prongs extend outwardly and upwardly from the obtuse angle junctions of the frame for impaling the hind legs of the animal, and a forwardly contoured loop portion having a restricted passageway between the frame and the loop enclosure is adapted for supporting the animal from its neck for completion of the skinning procedure and subsequent evisceration.

5 Claims, 5 Drawing Figures

U.S. Patent   June 13, 1978   4,094,041
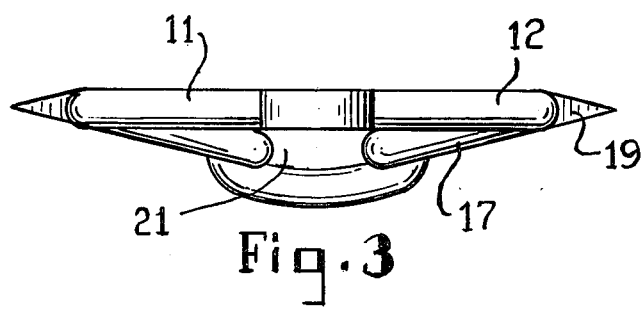
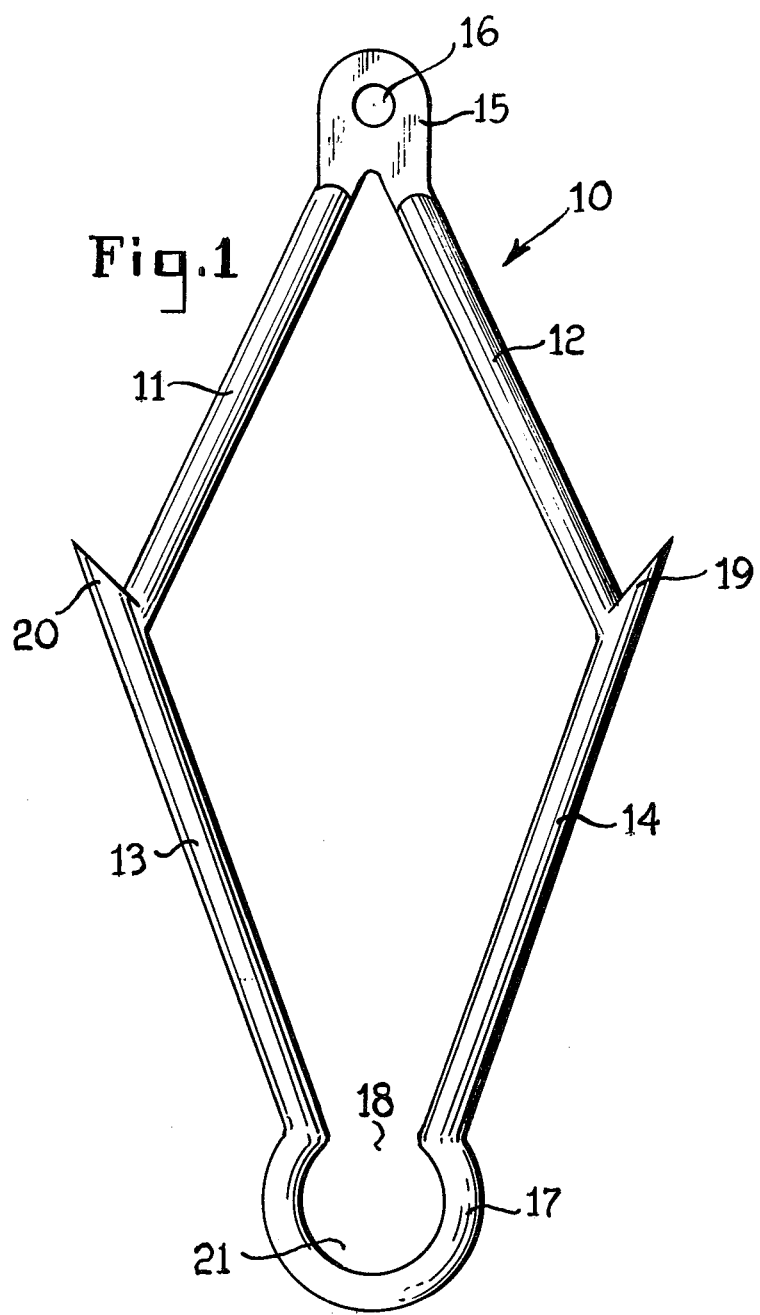
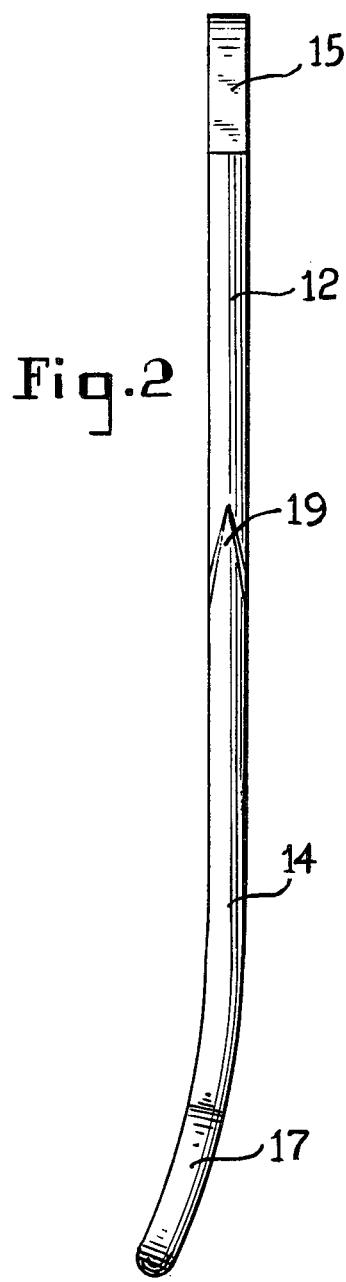

DRESSING HOLDER FOR SMALL GAME

BACKGROUND OF THE INVENTION

The present invention relates to devices on which the carcasses of small animals may be removably mounted in order to facilitate the dressing out of the carcass. The dressing operation preferably includes the steps of first removing the skin from the back of the animal while it is held with its back facing the operator in a head-down position, followed by completion of hide removal and evisceration, during which procedure it is advantageous to hold the carcass with its underside facing the operator in a head-up posture.

That the above-described sequential positioning of a small animal carcass is effective in facilitating its dressing out has been recognized in prior art disclosures, and a large number of devices for the purpose are found in the prior art under such titles as shackles, hangers, holders and dressing boards.

Many of the holders and dressing boards embody one or more movable members, the actuation of which is essential to the designated use of the structure. A lesser number of the shackles, particularly poultry shackles, are unitary rigid structures. There appears in the prior art no holder including a simple one-piece, generally diamond-shaped frame structure having pointed prongs at horizontally disposed, diametrically opposed vertices for suspending a small carcass in the head-down posture and also having a vertically displaced vertex replaced by a neck-receiving loop extending downwardly from the lower end portion of the diamond-shaped frame.

SUMMARY OF THE INVENTION

The small game holder described herein utilizes a one-piece frame having generally the configuration of an elongated quadrilateral diamond with the longitudinal axis of the frame in a vertically orientated position. Each of the upwardly diverging lower legs of the frame is coextensively extended upwardly and outwardly in the form of a prong or pointed projection at one of the horizontally spaced obtuse angle vertices, each prong being adapted for piercing one of the spaced-apart hind legs of a small animal carcass in order to suspend the carcass from the prongs in a hanging headdown position.

The downwardly converging lower legs of the diamond-shaped frame do not intersect at their lower ends, but rather are extended downwardly to form a downwardly directed arcuate loop portion. The spacing of the lower ends of the downwardly converging legs of the frame is less than the diameter of the arcuate loop, this construction providing a restricted access opening at the upper portion of the loop for receiving the neck of a carcass for suspending it in a head-up posture. To preclude blocking of access to the loop when the holder is hung along a vertical wall, the lower legs of the frame along with the loop portion are curved forwardly to assure that the loop portion is spaced forwardly from the surface of the wall.

BRIEF DESCRIPTION OF THE DRAWING

FIG. 1 is a front elevational view of the holder;

FIG. 2 is a side elevational view, showing the lower legs of the frame along with the loop portion curving forwardly to position the loop portion forwardly with respect to the plane defined by the rear surfaces of the upper legs of the frame;

FIG. 3 is a plan view;

DESCRIPTION OF THE PREFERRED EMBODIMENT

Figure 4:
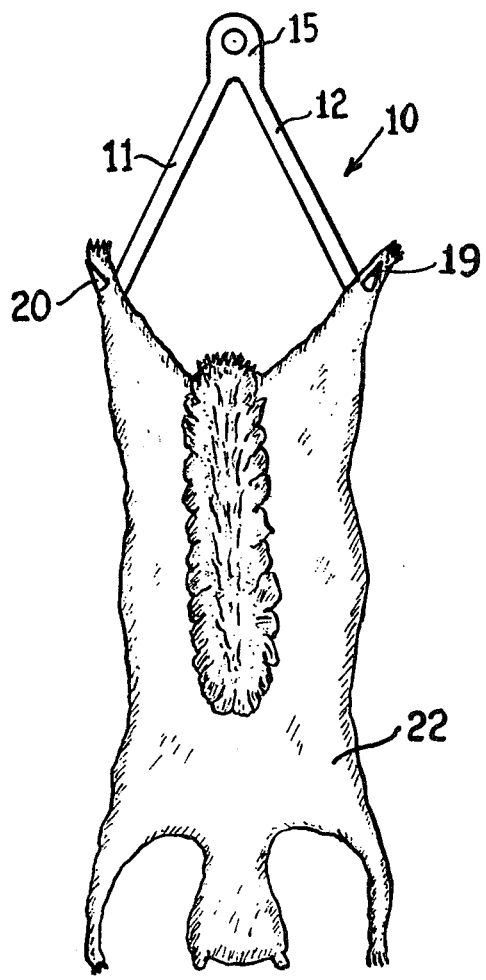
FIG. 4 shows the holder in use, there being shown a squirrel carcass supported from the transversely spaced pointed projections in the head-down position for starting a skinning procedure.

As shown in FIGS. 1, 2 and 3 of the drawing, the body portion of the holder 10 is an upstanding one-piece frame, generally in the shape of an elongated quadrilateral diamond. A hard, dense moldable plastic is a preferred material for forming the holder.

The upwardly converging legs 11 and 12 merge with the downwardly converging legs 13 and 14, thus defining the opposed obtuse angles of the diamond-shaped frame.

The prongs or pointed projections 19 and 20 extend outwardly and upwardly from the respective vertices of each of the horizontally spaced obtuse angles, each pointed projection being substantially coextensive with the associated lower leg of the frame and preferably needle sharp to facilitate its penetration through the leg of an animal carcass.

The upper ends of the upper legs 11 and 12 which define the upper acute angle of the diamond-shaped frame are merged with the upwardly extending tab portion 15, through which an aperture 16 rearwardly extends. The holder may be suspended either from a fastener passing through the aperture or by simply resting the under surface of the junction of the upper legs with the tab on some supporting element.

The lower ends of the downwardly converging legs 13 and 14 of the frame terminate in transverse spaced relationship as indicated at the numeral 18. From their respective terminations the legs are coextensively joined with the downwardly extending and forwardly projecting loop portion 17. The diameter and length of the loop portion, which is arcuate in configuration, are such that the spaced end portions of the legs 13 and 14 define a restricted top entrance to the enclosure 21, the ratio of the width of the opening 18 to the maximum diameter of the arcuate loop being not more than 0.75.

Figure 5:
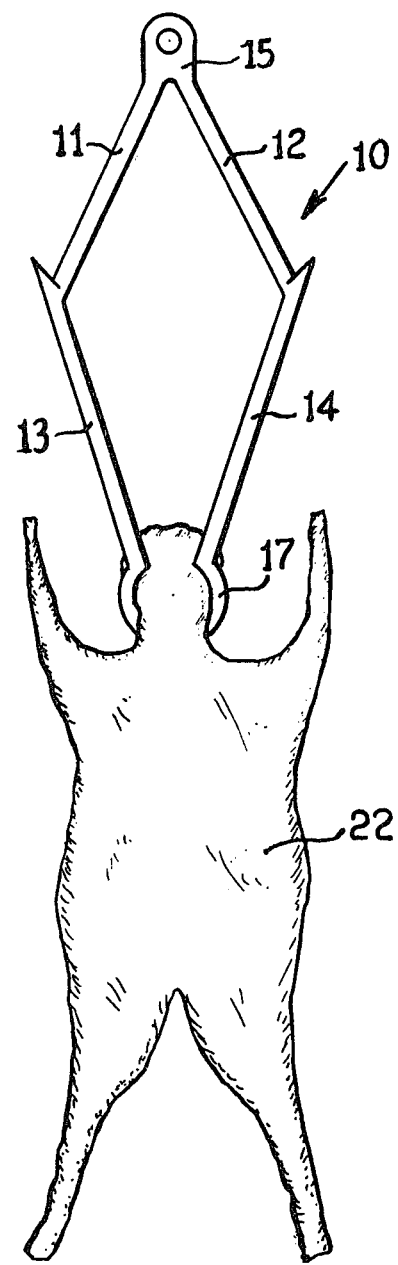
FIG. 5 shows the holder supporting the carcass from the neck-receiving loop in the head-up position, for completing the dressing out including evisceration.

The holder 10 in use during the dressing out of a squirrel is illustrated in FIGS. 4 and 5. In FIG. 4 the animal is shown depending from the prongs 19 and 20, the hind legs of the carcass having been penetrated by the prongs. The headdown position shown with the topside of the animal facing the operator has been found most advantageous for initiating the skinning procedure. Following removal of the hide from the topside, the carcass is removed from the prongs, rotated one-half turn, and suspended from its head after passing the neck downward into the loop 17, as shown in FIG. 5. While in this position, the dressing out of the carcass, including a continuation of the skinning process and subsequent evisceration, is completed.

What is claimed is:

1. A holder for facilitating dressing of small game comprising an upstanding diamond-shaped frame adapted for use in a position in which the vertices of the obtuse angles are diametrically opposed and the longitudinal axis of the diamond-shaped frame passes vertically in bisecting relationship with the upper acute angle defined by the upper pair of legs of said frame, a pointed projection extending outwardly and upwardly from each of the junctions of the upper and lower legs of said frame which define one of said obtuse angles, and a downwardly directed loop portion joined coextensively to transversely spaced lower ends of the downwardly converging lower legs of said frame, the maximum transverse width of the enclosure defined by said loop portion being less than the maximum transverse width of the enclosure defined by said diamond-shaped frame, and the separation of said transversely spaced lower ends being less than the maximum interior transverse width of said arcuate loop portion.

2. The holder as defined in claim 1, wherein each pointed projection extends from the upper end of the lower leg of said diamond-shaped frame with which it is associated and is coextensively aligned therewith.

3. The holder as claimed in claim 1, in which a lower portion of the lower legs of said frame along with said loop portion are positioned forwardly with respect to the plane defined by the rear surfaces of the upper legs of the frame, whereby access to the loop enclosure is facilitated when the holder is supported along a vertical wall surface.

4. The holder in accordance with claim 3, in which each projection is an upwardly pointed extension of one of the lower legs of said diamond-shaped frame.

5. A holder for facilitating dressing of small game comprising an upright, longitudinally extending generally quadrilateral diamond-shaped frame adapted for use in a position in which the obtuse angles bounded by the four legs of the diamond-shaped frame are horizontally opposed and the longitudinal axis of the diamond-shaped frame passes vertically in bisecting relationship with the upper acute angle defined by the upper pair of legs of said diamond-shaped frame, an upwardly extending tab merging with the juncture of the upper ends of said upper pair of legs, a rearwardly directed aperture in said tab for receiving a supporting member from which the holder may be suspended, a pointed projection extending outwardly from each of the junctions of the upper and lower legs of said frame which define one of said obtuse angles, and a downwardly directed arcuate loop portion joined coextensively to transversely spaced lower ends of the downwardly converging lower legs of said frame, the separation of said transversely spaced lower ends being less than the diametral width of the enclosure defined by said arcuate loop portion.

* * * * *